US006595305B1

(12) United States Patent
Dunn et al.

(10) Patent No.: US 6,595,305 B1
(45) Date of Patent: Jul. 22, 2003

(54) DRILL BIT, HARD MEMBER, AND BIT BODY

(75) Inventors: Curnie A. Dunn, Bristol, VA (US); Phillip W. Haga, Chilhowie, VA (US); Ted R. Massa, Latrobe, PA (US); Douglas E. Bise, Chilhowie, VA (US); Gary J. Condon, Irwin, PA (US); Stephen T. Belsheim, Kingston Springs, TN (US); James E. Rutherford, Big Stone Gap, VA (US)

(73) Assignee: Kennametal Inc., Latrobe, PA (US)

( * ) Notice: Subject to any disclaimer, the term of this patent is extended or adjusted under 35 U.S.C. 154(b) by 0 days.

(21) Appl. No.: 09/591,644

(22) Filed: Jun. 9, 2000

Related U.S. Application Data (63) Continuation-in-part of application No. 09/500,813, filed on Feb. 15, 2000, now abandoned.

(51) Int. Cl.[7] .......................... E21B 10/38; E21B 10/58
(52) U.S. Cl. .................... 175/420.1; 175/336; 175/418
(58) Field of Search ................................ 175/336, 397, 175/414, 415, 417, 418, 419, 420.1, 421

(56) References Cited

U.S. PATENT DOCUMENTS

| 2,002,388 A | 5/1935 | Bannister |
| 2,578,593 A | 12/1951 | Phipps |
| 2,735,656 A | 2/1956 | Hoglund et al. |
| 2,802,642 A | 8/1957 | Feucht ........................ 255/64 |
| 2,894,726 A | 7/1959 | Weaver et al. ................. 255/61 |
| 3,131,779 A | 5/1964 | Rowley et al. |
| 3,140,749 A | 7/1964 | Dionisotti ................... 175/410 |
| 3,592,276 A | 7/1971 | Pyles |
| 3,595,327 A | 7/1971 | Self |
| 3,613,807 A * | 10/1971 | Galis .......................... 175/209 |
| 4,143,920 A | 3/1979 | Haddock ..................... 299/79 |
| 4,165,790 A * | 8/1979 | Emmerich ................ 175/420.1 |
| 4,189,013 A | 2/1980 | Adams et al. ............... 175/320 |
| 4,190,128 A * | 2/1980 | Emmerich ................ 175/420.1 |
| 4,206,821 A | 6/1980 | Emmerich ................... 175/321 |
| 4,216,832 A | 8/1980 | Stephenson et al. ........ 172/540 |
| 4,330,044 A | 5/1982 | Orr et al. |

(List continued on next page.)

FOREIGN PATENT DOCUMENTS

| DE | 3025890 | 1/1982 |
| DE | 3317441 | 3/1993 |
| EP | 0941794 | 9/1999 |
| FR | 2543212 | 9/1984 |
| FR | 2779366 | 12/1999 |
| GB | 2123523 | 2/1984 |
| WO | 8502442 | 6/1985 |

OTHER PUBLICATIONS

PCT Search Report mailed Sep. 23, 2002, in related application PCT/US02/18345, filed Jun. 11, 2002.
PCT Search Report Mailed Apr. 17, 2001.
Sitler, Manufactured Diamond and Enhanced Mining Tool Performance, Presentation No. 85–58 at SME–SIME Annual Meeting (Feb. 24–28, 1985) New York, New York.
Wimet Mining Brochure (date unknown).
Carboloy Catalog No. MT7–241 cover page and p. 16 (date unknown).
Kennametal Mining Products Catalog, (1992) Kennametal Inc. pp. 18–19.

*Primary Examiner*—David Bagnell
*Assistant Examiner*—Jennifer H Gay
(74) *Attorney, Agent, or Firm*—Kevin P. Weldon (57) ABSTRACT

A rotary drill bit for penetrating earth strata wherein the drill bit includes a drill bit body that has an axial forward end. The drill bit body has a hard insert, which is preferably monolithic, that is affixed to the drill bit body at the axial forward end thereof. The hard insert presents at least three discrete leading cutting edges for cutting the earth strata.

38 Claims, 8 Drawing Sheets

U.S. PATENT DOCUMENTS

| | | | |
|---|---|---|---|
| 4,352,400 A | 10/1982 | Grappendorf et al. | 175/330 |
| 4,446,936 A | 5/1984 | Sarin et al. | |
| 4,488,609 A | 12/1984 | Sarin | |
| 4,492,278 A | 1/1985 | Leighton | |
| 4,497,520 A | 2/1985 | Ojanen | 299/86 |
| 4,511,006 A | 4/1985 | Grainger | 175/57 |
| 4,515,230 A * | 5/1985 | Means et al. | 175/420.1 |
| 4,527,638 A * | 7/1985 | Sanchez et al. | 175/420.1 |
| 4,527,931 A | 7/1985 | Sarin | 407/113 |
| 4,550,791 A | 11/1985 | Isakov | |
| 4,605,079 A | 8/1986 | Leibee et al. | |
| 4,667,756 A * | 5/1987 | King et al. | 175/425 |
| 4,712,626 A * | 12/1987 | Shaw | 175/420.1 |
| 4,716,976 A * | 1/1988 | Isakov | 175/420.1 |
| 4,725,099 A | 2/1988 | Penkunas et al. | 299/86 |
| 4,787,464 A | 11/1988 | Ojanen | 175/57 |
| 4,819,748 A | 4/1989 | Truscott | |
| 4,838,366 A | 6/1989 | Jones | |
| 4,951,761 A * | 8/1990 | Peetz et al. | 175/394 |
| 5,172,775 A | 12/1992 | Sheirer et al. | 175/57 |
| 5,180,022 A | 1/1993 | Brady | 175/430 |
| 5,184,689 A | 2/1993 | Sheirer et al. | 175/420.1 |
| 5,220,967 A * | 6/1993 | Monyak | 175/420.1 |
| 5,269,387 A | 12/1993 | Nance | 175/420.1 |
| 5,287,937 A | 2/1994 | Sollami et al. | 175/427 |
| 5,303,787 A | 4/1994 | Brady | 175/430 |
| 5,375,672 A * | 12/1994 | Peay et al. | 175/420.1 |
| 5,400,861 A | 3/1995 | Sheirer | 175/427 |
| 5,429,199 A | 7/1995 | Sheirer et al. | 175/321 |
| 5,452,628 A * | 9/1995 | Montgomery et al. | 175/393 |
| 5,458,210 A * | 10/1995 | Sollami | 175/420.1 |
| 5,467,837 A | 11/1995 | Miller et al. | 175/420.1 |
| 5,551,811 A | 9/1996 | Satran et al. | 407/40 |
| 5,829,540 A * | 11/1998 | Peay et al. | 175/420.1 |
| 5,878,634 A * | 3/1999 | Tibbitts | 76/108.2 |
| 5,992,546 A * | 11/1999 | Heinrich et al. | 175/374 |
| 5,996,714 A * | 12/1999 | Massa et al. | 175/413 |
| 5,996,715 A * | 12/1999 | Peay et al. | 175/420.1 |
| 6,065,908 A | 5/2000 | Kleine et al. | 408/67 |
| 6,092,612 A * | 7/2000 | Brady | 175/325.2 |
| 6,145,606 A * | 11/2000 | Haga | 175/420.1 |
| 6,260,637 B1 * | 7/2001 | Haussmann et al. | 175/420.1 |
| 6,260,638 B1 * | 7/2001 | Massa et al. | 175/420.1 |

\* cited by examiner

DRILL BIT, HARD MEMBER, AND BIT BODY

CROSS-REFERENCE TO EARLIER PATENT APPLICATION INVENTION

This patent application is a continuation-in-part patent application to U.S. patent application Ser. No. 09/500,813, filed on Feb. 15, 2000, for DRILL BIT, HARD MEMBER, AND BIT BODY, by Dunn et al has been abandoned.

FIELD OF THE INVENTION

The invention pertains to an earth penetrating rotary drill bit that has a hard member at the axial forward end thereof, a hard member, and a bit body.

BACKGROUND OF THE INVENTION

The expansion of an underground coal mine requires digging a tunnel that initially has an unsupported roof. To provide support for the roof, a rotary drill bit (e.g., a roof drill bit) is used to drill boreholes, which can extend from between about two feet to about (or even greater than) twenty feet, into the earth strata. Roof bolts are affixed within the boreholes and a roof support (e.g., a roof panel) is then attached to the roof bolts. Examples of a conventional roof drill bit with an axial forward slot that carries a blade style hard insert are the KCV4-1RR and KCV4-1 1/32RR Roof Rocket™ drill bits made by Kennametal Inc. of Latrobe, Pa. USA and shown in U.S. Pat. No. 5,172,775 to Sheirer et al.

While the Kennametal Rook Rocket roof drill bits exhibit adequate performance, including a satisfactory penetration rate, it would be desirable to provide a roof drill bit that permits completion of the drilling operation as soon as possible. A roof drill bit that presents at least three leading cutting edges increases the penetration rate due to an increase in the number of the leading cutting edges. Three leading cutting edges, especially with a radial orientation, permits the roof drill bit to advance forward with very little wobble (i.e., side-to-side movement) so as to achieve balanced drilling. Leading cutting edges that terminate short (i.e., at a point radially outward) of the center point of the hard insert define a central open area so as to reduce the amount of low velocity cutting, i.e., the cutting action that occurs nearer to the center point. An increase in the number of the leading cutting edges, the balanced drilling, and the reduction in low velocity drilling each contributes to an increase in the penetration rate of the roof drill bit, which provides for the efficient completion of the drilling operation.

Clogging and stalling may occur when drilling at a higher penetration rate. It would be an advantage to adequately handle and evacuate debris so as to reduce the potential for clogging. It would be an advantage to provide a roof drill bit with a drill bit body that can withstand the stresses inherent during stalling.

Debris impinges upon the roof drill bit that erodes away the steel body so as to increase the possibility of the hard insert becoming dislodged from the body. It would be beneficial to reduce this erosion so as to better maintain the integrity of the braze joint between the hard insert and the bit body.

In the production of the roof drill bit, it would be desirable that the design of the hard insert and the bit body facilitate the correct positioning of the hard insert on the bit body. Furthermore, for such production it would also be desirable if the drill bit body would lend itself to being substantially formed through a process or a combination of processes such as, for example, cold forming or casting.

SUMMARY OF THE INVENTION

In one form thereof, the invention is a rotary drill bit for penetrating the earth strata. The drill bit includes a bit body that has an axial forward end wherein a hard insert, which preferably is monolithic, is affixed to the axial forward end thereof. The hard insert presents at least three leading cutting edges.

In still another form thereof the invention is a rotary drill bit for penetrating the earth strata wherein the drill bit has a drill bit body with an axial forward end defined at least in part by spaced apart first and second discrete axial forward surfaces. A hard insert, which preferably is monolithic, is affixed to the axial forward end of the drill bit body so as to form a joint therebetween wherein the joint is defined at least in part by the second discrete axial forward surface.

In yet another form thereof, the invention is a hard member, which preferably is monolithic, that attaches to a drill bit body with a central longitudinal axis so as to form a rotary drill bit. The hard member has a forward surface and a rearward surface. At least three discrete leading cutting edges project from the forward surface of the hard member.

In still yet another form thereof, the invention is an elongate rotary drill bit body that attaches to a hard member, which preferably monolithic, so as to form a rotary drill bit for penetrating earth strata that generates debris. The drill bit body has a peripheral surface and at least one scalloped portion in the peripheral surface. A debris breaker is within the scalloped portion so that debris impinges upon the debris breaker during the penetration operation.

In one form thereof the invention is a rotary drill bit for engaging an earth strata. The drill bit includes a drill bit body with an axial forward end and a hard body that is affixed to the drill bit body at the axial forward end thereof. The hard body carries at least three discrete cutting elements wherein each one of the cutting elements presents a leading cutting edge. The cutting elements are of a hardness greater than the hardness of the hard body and the bit body.

In another form thereof the invention is a roof drill bit body for attachment to a hard member so as to form a rotary drill bit for penetrating earth strata that generates debris wherein the drill bit body comprises a central bore, and a peripheral surface. The peripheral surface contains a trio of debris apertures wherein each aperture is in communication with the central bore.

BRIEF DESCRIPTION OF THE DRAWINGS

The following is a brief description of the drawings that form a part of this patent application.

DETAILED DESCRIPTION OF THE INVENTION

Figure 1:
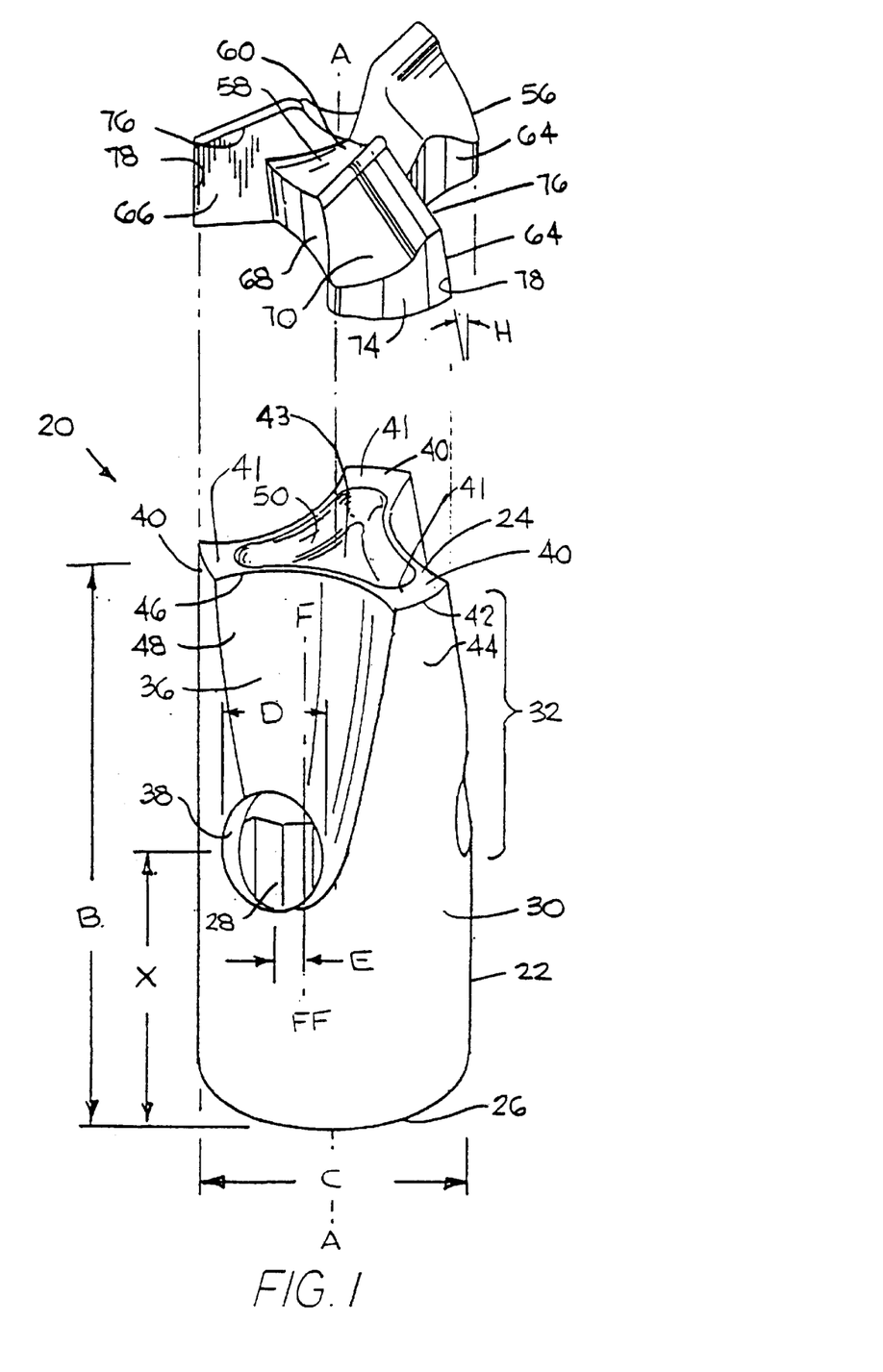
FIG. 1 is an isometric view of a specific embodiment of a roof drill bit wherein the hard insert is exploded away from the drill bit body.

Referring to the drawings, there is a roof drill bit generally designated as 20 with a central longitudinal axis A—A. Roof drill bit 20 includes a generally cylindrical elongate steel drill bit body 22 of an axial length "B" equal to 1.968 inches (5.0 centimeters [cm]) and a diameter "C" equal to 1 inch (2.54 cm). Bit body 22 further includes an axial forward end 24, an axial rearward end 26, a central longitudinal bore 28, and a generally cylindrical peripheral surface 30.

There is a pedestal portion (brackets 32) near the axial forward end 24. Pedestal portion 32 includes a trio of arcuate dished-out scalloped surfaces 36 that become narrower, as well as shallower, as they move in an axial rearward direction. Each scalloped surface 36 contains a generally circular debris port 38 of a diameter "D" equal to 0.375 inches (0.95 cm) near the axial rearward edge thereof. Each dust port 38 is slightly offset a distance "E" equal to 0.082 inches (2.08 millimeters [mm])from the centerline F—F of the scalloped surface 36. The center of the debris port 38 is spaced a distance "X" equal to 0.939 inches (2.38 cm) from the axial rearward end 26 of the bit body 22. Debris ports 38 permit evacuation of the drilling debris, including larger size pieces of debris, under the influence of a vacuum in dry drilling. The roof drill bit is also useful for wet drilling.

The pedestal portion 32 includes a trio of pedestal lobes 40 wherein each lobe 40 is defined between each pair of the scalloped surfaces 36. The axial forward end 24 presents a discrete first axial forward surface 41 and a discrete second axial forward surface 43.

Each pedestal lobe 40 has a distal peripheral edge 42 adjacent a distal peripheral surface 44, and a leading edge 46 near a leading peripheral surface 48. The distal peripheral surface 44 of the pedestal portion 32 widens as it moves in an axial rearward direction so that the pedestal portion of the drill bit body essentially widens as it moves in the axial rearward direction. The widening of the pedestal portion body provides for excellent strength and assists the drill bit body to resist failure during stalling of the roof drill bit.

The roof drill bit body 22 further contains a lobed socket 50 in the axial forward end 24 thereof. Lobed socket 50 presents a trio of generally radial socket lobes equi-spaced apart about one hundred twenty degrees. As clearly shown in the drawings, a bottom second axial forward surface of the lobed socket 50 is generally parallel to a peripheral first axial forward surface of the axial forward end 24 of the drill bit body 22. As described hereinafter, the configuration of the lobed socket 50 corresponds to the configuration of a lobed projection that depends from the bottom surface of a hard insert.

The roof drill bit 40 further includes a hard insert 56 that presents three discrete leading cutting edges. However, there may be more than three discrete leading cutting edges depending upon the application.

The hard insert 56 is preferably (but not necessarily) a single monolithic member formed by powder metallurgical techniques from a hard material such a cemented (e.g., cobalt) tungsten carbide alloy wherein a powder mixture is pressed into a green compact and then sintered to form a substantially fully dense part. Applicants contemplate that the hard insert also could be made by injection molding techniques. The preferred grade of cemented tungsten carbide for the hard insert (i.e., Grade 1) contains 6.0 weight percent cobalt (the balance essentially tungsten carbide), and has a tungsten carbide grain size of 1–8 micrometers and a Rockwell A hardness of about 89.9.

Hard insert 56 has a top surface 58 with a central area 60 surrounding the center point "G" (see FIG. 2) and a bottom surface 62. Hard insert 56 has a trio of lobes 64 wherein each lobe 64 has a generally planar leading surface 66, a trailing surface 68, and a contoured top (or relief) surface 70. The relief surface 70 has a leading convex upper portion and a trailing concave lower portion wherein there is a smooth transition between the upper leading portion and the trailing lower portion.

When the hard insert 56 is affixed to the drill bit body 22, the leading surface 66 of each first lobe 64 is disposed at a rake angle "H" (see FIG. 1) of about negative five degrees. The rake angle "H" may range from about zero to about negative fifteen degrees, and more preferably range from about negative five degrees to about negative fifteen degrees. By exhibiting a negative rake angle, applicants provide a hard insert with a strong leading cutting edge. The negative rake angle also provides for better powder flow during the fabrication process so as to enhance the overall integrity (including uniform density) of the hard insert.

Figure 2:
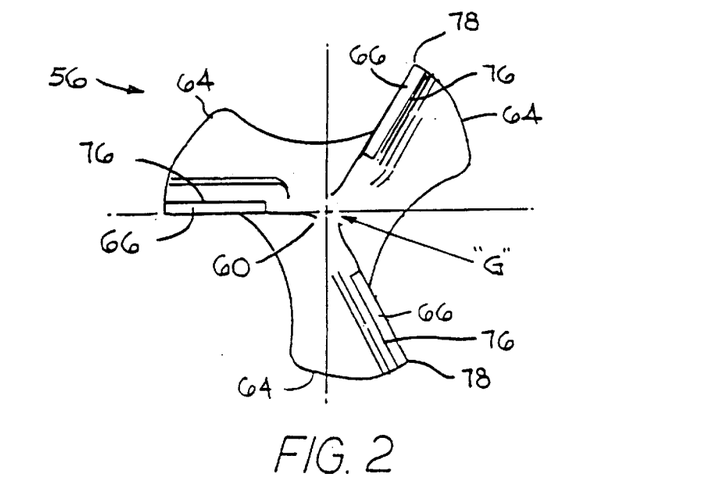
FIG. 2 is a top view of the hard insert of FIG. 1.
Figure 3:
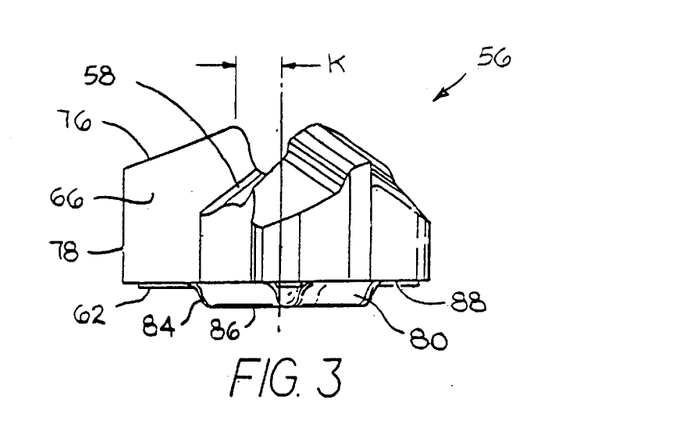
FIG. 3 is a side view of the hard insert of FIG. 1.

Each lobe 64 further includes a distal peripheral surface 74. The leading surface 66 intersects the relief surface 70 at the upper portion thereof so as to form a generally straight leading cutting edge 76 at the intersection thereof. The leading surface 66 intersects the distal peripheral surface 74 to form a generally straight side clearance cutting edge 78 at the intersection thereof. While the leading cutting edge 76 presents a generally straight geometry, applicants contemplate that the leading cutting edge may take on a different configuration such as, for example, an arcuate configuration in either or both the vertical and horizontal directions.

Figure 4:
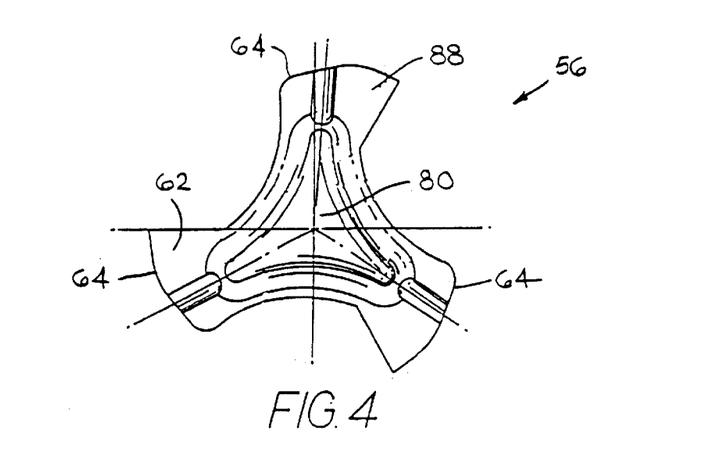
FIG. 4 is a bottom view of the hard insert of FIG. 1.

The hard insert 56 has a lobed projection 80, which has a trio of projection lobes spaced apart about one hundred twenty degrees, that depends away from the bottom surface 62 of the hard insert. Lobed projection 80 has a side surface 84 and a bottom surface 86. The bottom surface 62 of the hard insert has a shoulder 88 that surrounds the lobed projection 80 and is generally parallel to the bottom surface 62. Each one of the projection lobes has a general radial orientation so that its central longitudinal axis passes through the geometric center of the hard insert (i.e., the point on the hard insert that lies along the central longitudinal axis A—A of the roof drill bit 20 when the hard insert is affixed to the bit body).

Referring back to the geometry of the leading and side cutting edges, while these cutting edges are generally straight and perform in an acceptable fashion other cutting edge geometries are acceptable for use. For example, the following patent documents disclose suitable cutting edge geometries: U.S. Pat. No. 4,787,464 to Ojanen, U.S. Pat. No. 5,172,775 to Sheirer et al., U.S. Pat. No. 5,184,689 to Sheirer et al., U.S. Pat. No. 5,429,199 to Sheirer et al., and U.S. Pat. No. 5,467,837 to Miller et al. Each one of the above patents is hereby incorporated by reference herein.

Referring to the assembled roof drill bit 20, it is typical that the hard insert 56 is brazed to the axial forward end 24 of the bit body 22. More specifically, the lobed projection 80 depending from the bottom surface 62 of the hard insert 56, has a corresponding geometry with, and thus is received within, the lobed socket 50 contained in the axial forward end 26 of the bit body 22. There is geometric correspondence between the shape of the lobed socket 50 and the shape of the lobed projection 80 whereby the projection 80 is received within the socket 50 so as to ensure that the hard insert is correctly positioned with respect to the drill bit body 22. There is a braze joint between the surface of the drill bit body at the axial forward end thereof and the rearward surface of the hard insert wherein the braze joint includes the surfaces defining the projection on the hard insert and the socket in the drill bit body, as well as the shoulder of the hard insert and the peripheral surface of the bit body that surrounds the socket, i.e., the axial forward most surface.

The preferred braze alloy is HI-TEMP 548 braze alloy manufactured and sold by Handy & Harmon, Inc., 859 Third Avenue, New York, N.Y. 10022. HI-TEMP 548 braze alloy is composed of 55+/−1.0 weight percent copper, 6+/−0.5 weight percent nickel, 4+/−0.5 weight percent manganese, 0.5+/−0.05 weight percent silicon, and the balance zinc with 0.50 weight percent maximum on total impurities. Additional information on HI-TEMP 548 braze alloy may be found in Handy & Harmon Technical Data Sheet D-74 available from Handy & Harmon, Inc.

When in the assembled condition, the radially outward portion of the leading cutting edge 76 of each lobe 64 extends forward of the leading peripheral surface 48 of its corresponding pedestal lobe 40. This distance decreases as the leading cutting edge 76 moves in a radial inward direction. Furthermore, for each lobe 64 the side clearance cutting edge 78 extends a distance in a radial outward direction past the distal peripheral surface 44 of its corresponding pedestal lobe 40.

Referring to FIG. 2, the leading cutting edges 76 of the hard insert 56 have a generally radial orientation. If the rake angle is zero degrees, then a line laying along each leading cutting edge when extended in a radial inward direction passes through the center point "G" of the hard insert 56. The center point "G" lies on the central longitudinal axis A—A of the roof drill bit 20.

Each one of the leading cutting edges 76 begins at a point that is a distance "K" (FIG. 3) [equal to 0.125 inches (3.2 mm)] radially outward of the center point "G" of the hard insert 56. Each cutting edge 76 then extends in a radial outward direction so as to terminate at a point radially outward of the peripheral surface of the drill bit body 22. There is an open central area 60 (see FIG. 2) surrounding the center point "G" of the hard insert. The portion of each leading cutting edge nearer the center point "G" travels a shorter distance per revolution than does the distal portion of each leading cutting edge. Because each leading cutting edge 76 does not extend to the center point of the hard insert 56 there is a reduction in the amount of low velocity cutting, i.e., cutting that occurs at or near the center point of the hard insert. Generally speaking, a reduction in the amount of low velocity cutting increases the penetration rate of a roof drill bit so that (all other things being equal) an increase in the magnitude of distance "K" may increase the penetration rate.

In operation, the roof drill bit 20 rotates and impinges against the earth strata so that the leading cutting edges 76 contact the earth strata so as to cut a borehole and the side clearance cutting edges 78 cut the side clearance for the borehole. The circle cut by the hard insert is about 1.024 inches (2.6 cm) in diameter. Although optimum parameters depend upon the specific circumstance, typical rotational speeds range between about 450 to about 650 revolutions per minute (rpm) and typical thrusts range between about 1000 and 3000 pounds.

The drilling operation generates debris and dust particulates. In certain applications the higher penetration rates associated with the roof drill bit generates larger-sized debris that has the potential to clog the roof drill bit. The debris, and especially the larger-sized debris, needs to be handled and removed from the borehole so as to not interfere with the drilling operation. In roof drill bit 20, the debris smoothly moves over the leading surfaces 66 of each one of the lobes 64 and directly into the corresponding debris port 38. By providing a trio of debris ports, the roof drill bit 20 provides a way for the debris to quickly and efficiently be removed from the vicinity of the drilling. The removal of debris, and especially larger size debris, is enhanced by the configuration of the scalloped portion 36 and the offset and axial location of the debris port. The consequence is that the debris generated by the drilling (and especially larger-sized debris) does not interfere with the efficiency of the overall drilling operation.

Because these three discrete leading cutting edges 76 have a generally radial orientation, the roof drill bit 20 exhibits excellent balance so as to continue to steadily advance with little, and possibly no, wobble, i.e., side-to-side movement. While the generally radial orientation of the leading cutting edges appears to provide the above-described advantage, applicants would expect that the roof drill bit would still exhibit improved performance even if the hard insert would have leading cutting edges that would not have a generally radial orientation.

The hard insert 56 covers the entire axial forward end 24 (including the axial forward most surface) of the drill bit body 22. By providing coverage of the axial forward end 24 of the drill bit body 22 the hard insert 56 protects the braze joint between the hard insert and the drill bit body from erosion so as to maintain the integrity of the braze joint. This is especially true for the portion of the braze joint defined by the bottom surface and side surface of the lobed socket of the bit body and the corresponding surfaces of the hard insert since the braze joint is actually within a volume of the bit body protected by the hard insert.

Figure 5:
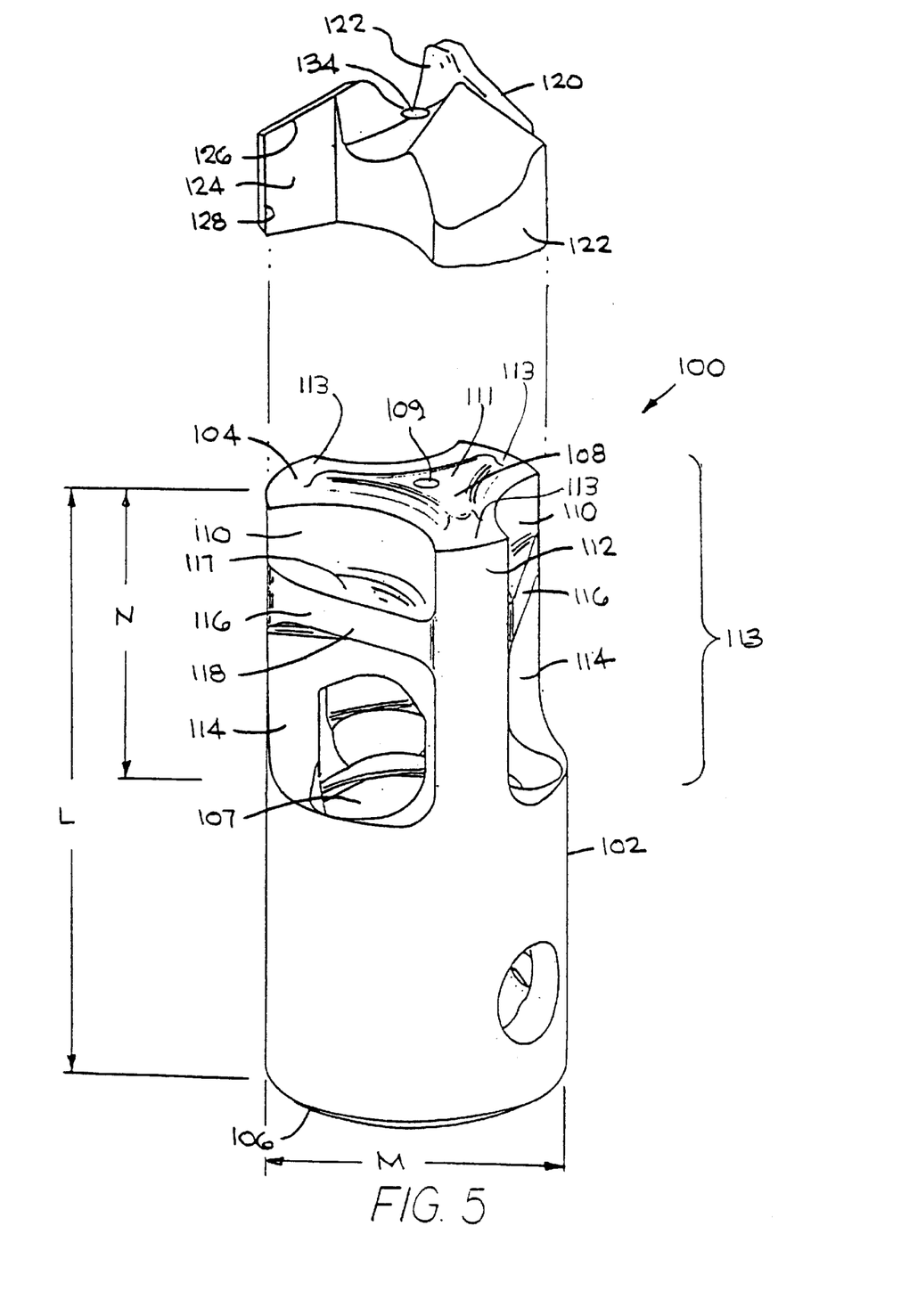
FIG. 5 is an isometric view of another specific embodiment of a roof drill bit with the hard insert exploded away from the drill bit body.

Referring to FIGS. 5 through 8, there is shown another embodiment of a roof drill bit generally designated as 100. Roof drill bit 100 has an drill bit body 102 with axial forward and rearward ends 104 and 106, respectively, and a central bore 107. Drill bit body 102 has an axial length "L" and a diameter "M." The drill bit body 102 has a lobed projection 108 with three lobes, each of which has a radial orientation, that projects in an axial forward direction from the axial forward end 104 thereof. Bit body 102 contains a central aperture 109 that passes through the axial forward end so as to communicate with the central bore 107. As best shown in FIG. 5, the distal end of the bit body projection has a first axial forward surface that forms a shoulder about the periphery of the lobed projection 108. The projection 108 at its top has a generally flat second axial forward surface. The first axial forward surface is generally parallel to the second axial forward surface. Axial forward end 104 has a discrete first axial forward surface 113 and a discrete second axial forward surface 111.

The drill bit body 102 further contains a trio of scalloped portions 110 that are equi-spaced about the circumferential surface of the drill bit body 102. Each scalloped portion 110 begins at the axial forward end 104 and extends in an axial rearward direction for a specific distance "N" where it terminates. The depth and width of each scalloped portion 110 remains essentially constant along its length. A lobe 112 is defined between each pair of scalloped portions 110. The lobes 112 and the scalloped portions 110 comprise a pedestal portion (as shown by brackets 113).

Each scalloped portion 110 contains a debris port 114 near the axial rearward end thereof. There is a debris breaker 116 mediate of the debris port 114 and the axial forward end 104 of the bit body 102. Debris breaker 116 presents a forward surface 117 and a side surface 118. The debris breaker 116 extends across the entire width of the scalloped portion 110.

Figures 6, 7:
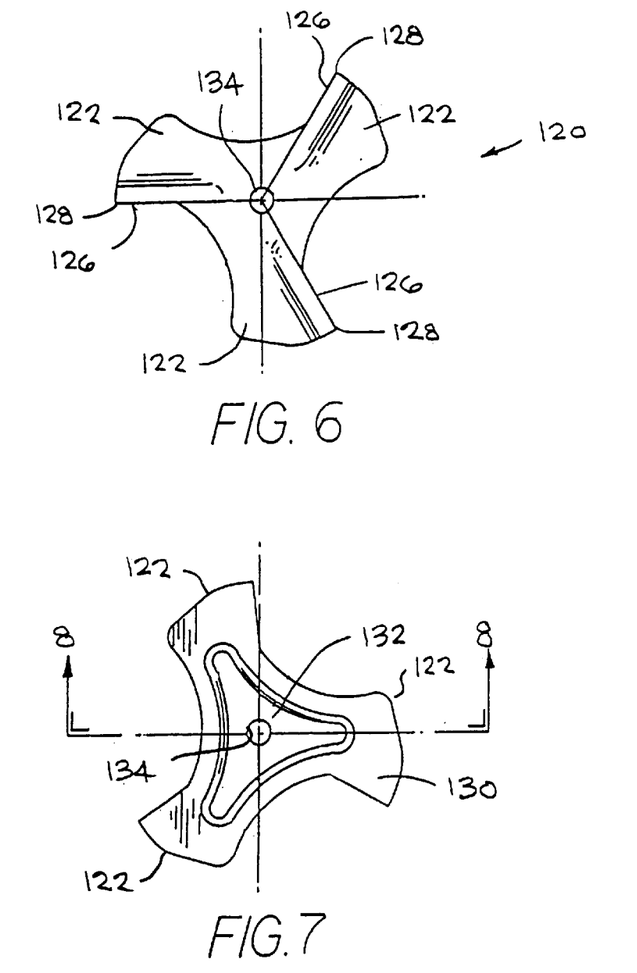
FIG. 6 is a top view of the hard insert of FIG. 5.
FIG. 7 is a bottom view of the hard insert of FIG. 5.
Figure 8:
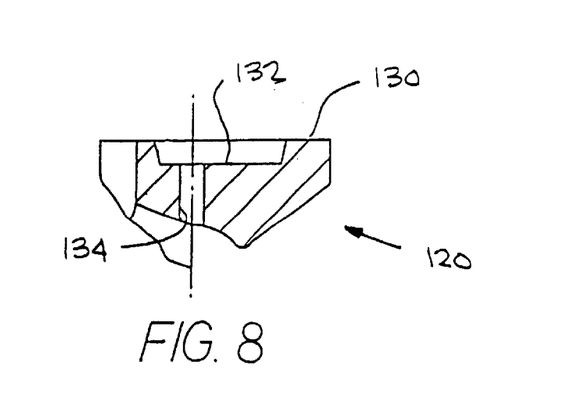
FIG. 8 is a cross-sectional view of the hard insert of FIG. 5 taken along section line 8—8 of FIG. 7.

The roof drill bit 100 further includes a hard insert 120 that presents a trio of lobes 122 equi-spaced apart about one hundred twenty degrees. Each lobe 122 has a generally leading surface 124, as well as a leading cutting edge 126 and a side clearance cutting edge 128. Hard insert 120 has a bottom surface 130 that contains a lobed socket 132 with three radial lobes. A central aperture 134 passes through the hard insert 120. For this hard insert 120 it should be appreciated that one may also define the radial orientation of the leading cutting edges 126 in terms of a vertical plane passing through the leading cutting edge 126 that when extended in a radial inward direction passes through the center point of the hard insert, as well as through the central longitudinal axis of the roof drill bit.

In operation, the roof drill bit 100 rotates and impinges the earth strata so that the leading cutting edges 126 engage and cut the earth strata so as to form a borehole. The side clearance cutting edge 128 also cuts the side clearance of the bore hole. Both of these cutting actions generates debris that for each lobe 122 flows over the leading surface 124 and into its corresponding scallop 110 where the debris impinges against the forward surface 117 of the debris breaker 116. As a result of this impingement the debris is broken into smaller pieces and diverted around the side surface 118 of the debris breaker 116 so that the debris takes a convoluted path to the debris port 114. The overall effect of the debris breaker 116 is to break the debris into smaller pieces when it enters the debris port 114. The chance that the roof drill bit will become clogged with debris becomes less as the size of the debris entering the debris port 114 becomes smaller. The roof drill bit 100 provides the same performance advantages, such a higher penetration rate, as does the roof drill bit 20.

Figure 9:
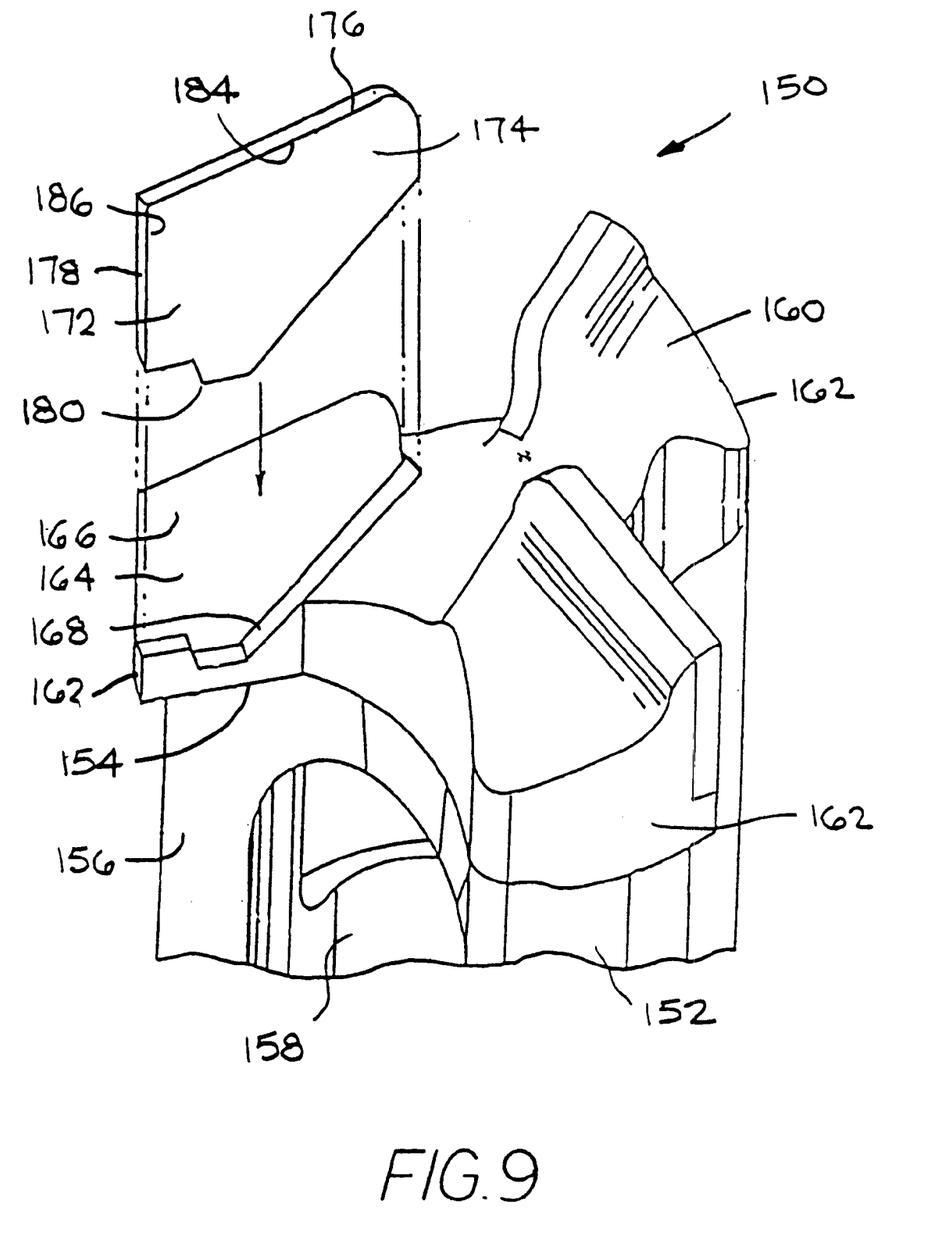
FIG. 9 is an isometric view of the axial forward portion of another specific embodiment of a rotary drill bit with a cutting insert exploded away from the hard member.

Referring to FIG. 9 there is shown still another embodiment of a roof drill bit 150 that has a drill bit body 152 with an axial forward end 154 and an axial rearward end (not illustrated). The bit body 152 also has a trio of scalloped portions 156 with a debris port 158 in each scalloped portion 156. Although it is not illustrated the axial forward end of the drill bit body 152 contains a lobed socket that has a configuration like the lobed socket 50 of roof drill bit 20.

Roof drill bit 150 also has a hard member 160 that has a trio of lobes 162 equi-spaced apart about one hundred twenty degrees. Although not illustrated the bottom surface of the hard member has a lobed projection that depends therefrom. This lobed projection has a configuration like that of the lobed projection 80 of hard insert 56.

When the hard member 160 is affixed (typically by brazing) to the bit body 152, the lobed projection on the hard member has a corresponding geometry, and thus, is received within the lobed socket in the drill bit body. The geometric correspondence between the lobed projection on the hard member and the lobed socket in the bit body ensures that when the projection is received within the socket the hard member is correctly positioned with respect to the bit body. There is a braze joint between the surface of the drill bit body at the axial forward end thereof and the rearward surface of the hard member wherein this joint includes those surfaces that define the lobed projection and the lobed socket, as well as the shoulder of the hard member surrounding the projection and the surface of the bit body that surrounds the lobed socket.

In an alternative embodiment, the bit body may have a lobed projection like lobed projection 108 of drill bit body 102 and the hard member may have a corresponding lobed socket like the lobed socket 132 in hard insert 120 so that upon assembly the projection on the bit body is received within the projection in the hard member. Along the lines of the above discussion, the geometric correspondence between the lobed socket in the hard member and the lobed projection of the bit body ensures the correct positioning of the hard member on the bit body. Also, there is a braze joint between the rearward surface (including the lobed socket) of the hard member and the axial forward surface (including the lobed projection) of the bit body.

Each lobe 162 contains a pocket 164 that has a rear surface 166 and a bottom surface 168. Each pocket 164 receives a cutting element 172. Each cutting element 172 has a leading surface 174, a top surface 176, a side surface 178, and a bottom surface 180. Cutting element 172 has a leading cutting edge 184 at the intersection of the leading surface 174 and top surface 176. Cutting element 172 has a side clearance cutting edge 186 at the intersection of the leading surface 174 and side surface 178. To facilitate correct positioning of the cutting element 172 in the pocket 164 when affixed thereto (typically by brazing), the geometry of the bottom surface 180 of the cutting element 172 corresponds to the geometry of the bottom surface 168 of the pocket 164. For example, in FIG. 9, the cutting element is shown having a projection that mates with a notch in the pocket.

The hardness of the bit body is typically less than the hardness of the hard member; however, certain applications may permit (or necessitate) the hardness of the bit body to be greater than (or equal to) the hardness of the hard member. The cutting element is typically harder than either the hardness of the bit body or the hardness of the hard member; however, applicants contemplate that in some instances the cutting element and the hard member may have the same or substantially the same hardness. For example, the cutting elements and the hard member may each be made from the same or different grades of cemented (cobalt) tungsten carbide.

In operation, the leading cutting edge contacts the earth strata to cut the borehole and the side clearance cutting edges cut the side clearance for the borehole. As the roof drill bit is used the cutting elements become worn so that it becomes necessary to replace them. The same is be true for the hard member. Replacement can be accomplished by removing the worn cutting insert or hard member and replacing the same with either a new or reworked replacement.

Referring to FIGS. 10 through 15 there is shown another specific embodiment of a drill bit body generally designated as 200. Drill bit body 200 has an axial forward end 202 and an axial rearward end 204. Drill bit body 200 contains a lobed socket 206 at the axial forward end 202 &thereof. Applicants intend that the drill bit body 200 be used in conjunction with a hard component that attaches (such as, for example, by brazing) to the drill bit body. For example, lobed socket 206 may receive a hard insert like hard insert 56 illustrated in FIG. 1 or lobed socket 206 may receive a hard member 160 like that illustrated in FIG. 9.

Figure 10:
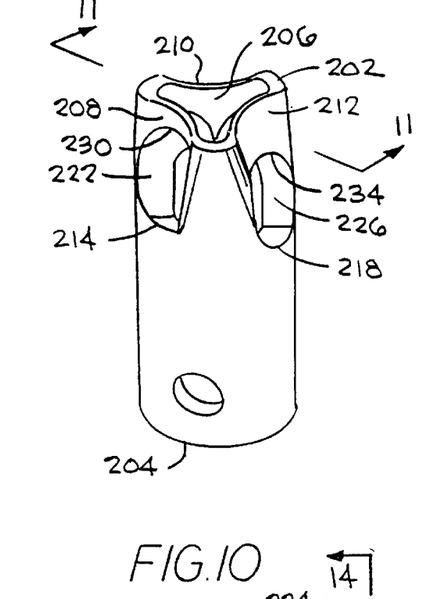
FIG. 10 is an isometric view of another embodiment of a drill bit body.
Figure 11:
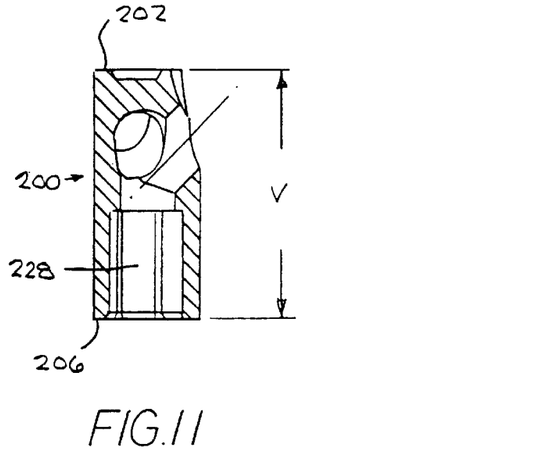
FIG. 11 is a cross-sectional view of the embodiment of FIG. 10 taken along section line 11—11.

Drill bit body 200 further contains a trio of circumferentially equi-spaced scallops 208, 210 and 212 in the exterior surface thereof. Although the drawings show three scallops, applicants contemplate that the invention may include three or more, i.e., at least three, scallops. Each scallop (208, 210, 212) has an axial forward boundary that is coextensive with a part of the axial forward end 202 of the drill bit body 200. Each scallop (208, 210, 212) further has an axial rearward boundary 214, 216, and 218.

Drill bit body 200 contains a debris port (or aperture) 222, 224 226 in each one of the scallops 208, 210, 212, respectively. Each one of the debris ports (222, 224, 226) communicates with a central bore 228 in the drill bit body 200. Although each debris port (222, 224, 226) is generally circular in cross-section and is of the same size, applicants contemplate that the debris ports may be non-circular in cross-section and may be of a different size.

Each one of the debris ports 222, 224, 226 is at a different distance from the axial forward end 202 of the drill bit body 200 so as to present a staggered orientation. In this regard, the axial forward edge 230 of debris port 222 is spaced a distance "S" (see FIG. 15) from the axial forward end 202 of the drill bit body 200 so that debris port 222 is the axial forward most of the debris ports. The axial forward edge 234 of debris port 226 is spaced a distance "U" (see FIG. 13) from the axial forward end 202 so that debris port 226 is the axial rearward most of the debris ports. The axial forward edge 232 of debris port 224 is spaced a distance "T" (see FIG. 14) from the axial forward end 202 so that debris port 224 is mediate of debris ports 222 and 226.

In one specific embodiment where the overall axial length of the drill bit body is length "V" and the diameter of each one of the debris ports is 0.060 inches (1.52 mm), distance "S" equals 0.125 inches (3.55 mm), distance "T" equals 0.219 inches (5.56 mm), distance "U" equals 0.313 inches (7.95 mm), and the length "V" equals 2.158 inches (5.48 cm).

A part of the axial rearward boundary of each scallop (208, 210, 212) is coextensive with the axial rearward edge of its corresponding debris port 222, 224, 226. Hence, the axial rearward boundary of each scallop is at a different distance from the axial forward end 202 of the drill bit body 200. Furthermore, each debris port is of the same size so that the center of each debris port is spaced a different distance from the axial forward end 202 of the drill bit body 200.

Figure 12:
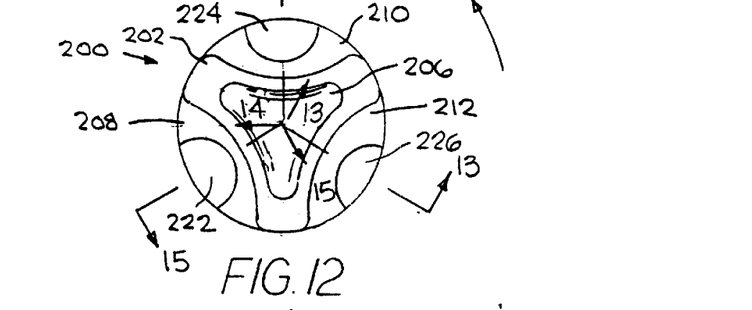
FIG. 12 is a top view of the embodiment of FIG. 10.
Figures 13, 14, 15:
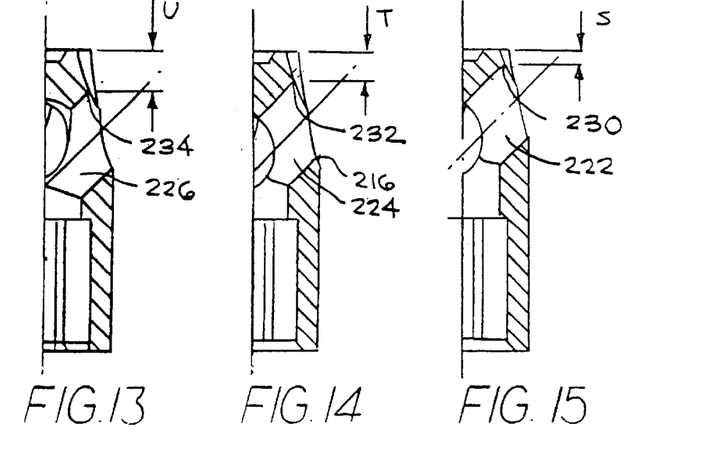
FIG. 13 is a cross-sectional view of the embodiment of FIG. 12 taken along section line 13—13 of FIG. 12.
FIG. 14 is a cross-sectional view of the embodiment of FIG. 12 taken along section line 14—14 of FIG. 12.
FIG. 15 is a cross-sectional view of the embodiment of FIG. 12 taken along section line 15—15 of FIG. 12.

In operation, the roof drill bit rotates in the direction indicated by the arrow "W" in FIG. 12. The staggered orientation of the trio of debris ports (222, 224, 226) facilitates the removal of debris from the area of drilling. In this regard, because the debris passing through each debris port enters the central bore 228 at a different location and at a different position along the axis of the drill bit body, the streams of debris do not impinge upon each other in such way so as to create turbulence or the like. The result is that the debris easily moves into and through the debris ports (222, 224, 226) and into and down the central bore 228 under the influence of a vacuum.

FIG. 16 through FIG. 19 illustrate another specific embodiment of a drill bit body generally designated as 240. Drill bit body 240 has an axial forward end 242 and an axial rearward end 244. Drill bit body 240 contains a lobed socket 246 that receives a hard component like the lobed socket 206 of drill bit body 200 described above.

Figure 16:
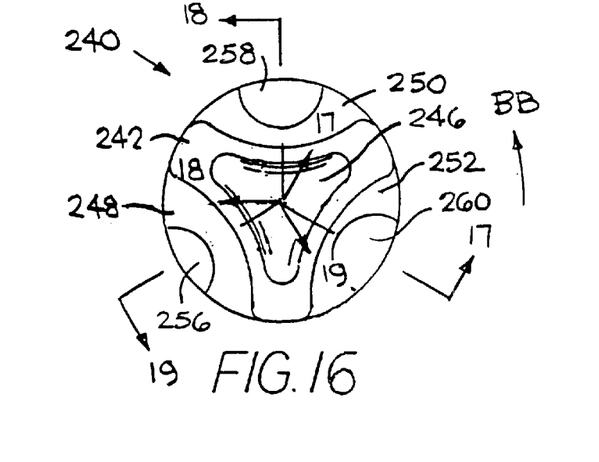
FIG. 16 is a top view of another specific embodiment of a drill bit body.
Figure 17:
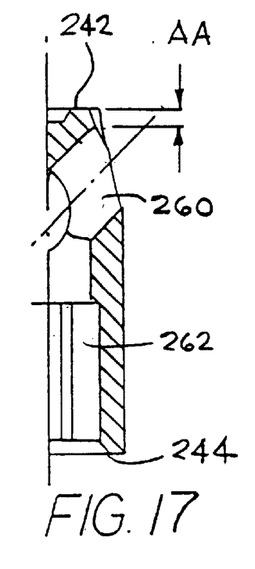
FIG. 17 is a cross-sectional view of the embodiment of FIG. 16 taken along section line 17—17.
Figure 18:
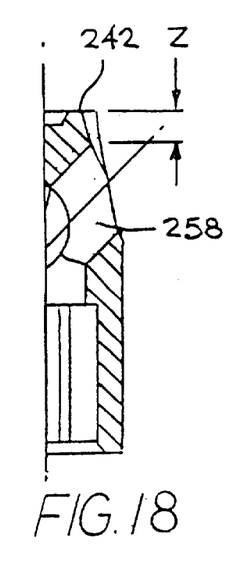
FIG. 18 is a cross-sectional view of the embodiment of FIG. 16 taken along section line 18—18.
Figure 19:
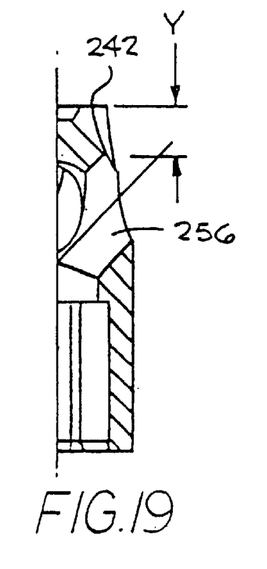
FIG. 19 is a cross-sectional view of the embodiment of FIG. 16 taken along section line 19—19.

Drill bit body 240 contains a trio of circumferentially equi-spaced scallops (248, 250, 252) in the exterior surface thereof. Drill bit body 240 further contains a debris port (or aperture) (256, 258, 260) in each one of the scallops (248, 250, 252), respectively. Each one of the debris ports communicates with a central bore 262 in the drill bit body 240.

Each one of the debris ports is at a different distance from the axial forward end 242 of the drill bit body 240 so as to present a staggered orientation. In this regard, the axial forward edge of debris port 256 is a distance "Y" from axial forward end 242, the axial forward edge of debris port 258 is a distance "Z" from the axial forward end 242, and the axial forward edge of debris port 260 is a distance "AA" from the axial forward end 242.

In the orientation shown in FIGS. 16–19 hereof, the distance the forward edge of each debris port is spaced apart from the axial forward end 242 of the drill bit body 240 increases in the direction of rotation "BB" as one moves from debris port 260 to debris port 258 to debris port 256. This is in contrast to the orientation of the debris ports of the embodiment of FIGS. 10–15 in which the distance the forward edge of each debris port is spaced apart from the axial forward end 202 of the drill bit body 200 decreases in the direction of rotation "W" as one moves from debris port 226 to debris port 224 to debris port 222.

In operation, the roof drill bit rotates in the direction indicated by the arrow "BB" in FIG. 16. The staggered orientation of the trio of debris ports (256, 258, 260) facilitates the removal of debris from the area of drilling by allowing the debris to easily move into and through the debris ports and into and through the central bore 262 under the influence of a vacuum in a fashion like that for drill bit body 200.

Figure 21:
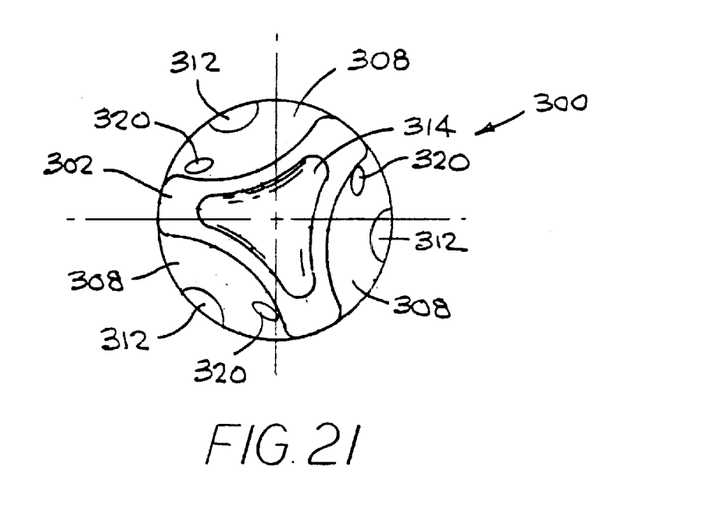
FIG. 21 is a top view of the roof drill bit body of FIG. 20.

FIGS. 21 and 22 illustrate another embodiment of a roof drill bit body generally designated as 300. Roof drill bit body 300 has an axial forward end 302, an axial rearward end 304, and a generally cylindrical peripheral surface 306. Roof drill bit body 300 contains a trio of scallops 308 generally equi-spaced about the circumference of the peripheral surface 306. Each scallop 308 begins adjacent the axial forward end 302 and depends in a rearward direction so as to terminate in a rearward edge 310. Roof drill bit body 300 further contains a relief surface 312 near the rearward edge 310 of each scallop 308.

Roof drill bit body 300 contains a lobed socket 314 in the axial forward end 302 thereof. Applicants intend that-the roof drill bit body 300 be used in conjunction with a hard component that attaches (such as, for example, by brazing) to the roof drill bit body 300. Lobed socket 314 presents a geometry like lobed socket 206 so that it may receive a hard insert like hard insert 56 shown in FIG. 1 or a hard member like hard member 160 shown in FIG. 9.

The braze alloy may be in the form of braze shim that has such a shape so that during the manufacturing process the shim rests within the lobed socket. In this regard, the use of the braze shim permits the pre-assembly of the components before commencement of the brazing operation.

Figure 20:
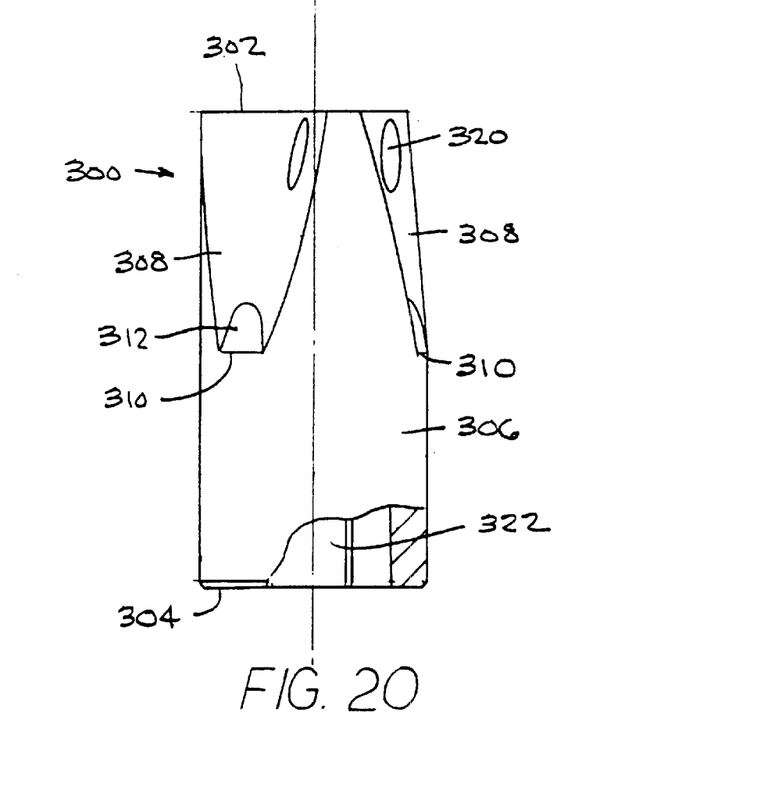
FIG. 20 is a side view of another specific embodiment of a roof drill bit body that contains fluid ports and with a portion of the body cut away to show the central bore.

Roof drill bit body 300 further contains in each scallop 308 a fluid port 320. Fluid port 320 is positioned near the axial forward end 302 of the drill bit body 300. Each fluid port 320 is in fluid communication with a central bore 322. Each fluid port 320 has an orientation so that when fluid exits the port it flows toward the axial forward end 302 of the drill bit body 300 and the hard component. A typical fluid is water.

In a wet drilling operation, the roof drill bit body 300, which has a hard component attached thereto, engages the earth strata so as to drill a bore hole therein. Water under pressure passes into the central bore 322 and flows through the fluid ports 320 so as to pass toward the axial forward end 302 of the body 300 and the hard component.

The patents and other documents identified herein are hereby incorporated by reference herein.

Other embodiments of the invention will be apparent to those skilled in the art from a consideration of the specification (including the drawings) or practice of the invention disclosed herein. It is intended that the specification and examples be considered as illustrative only, with the true scope and spirit of the invention being indicated by the following claims.

What is claimed is:

1. A rotary drill bit for penetrating earth strata, the drill bit comprising: an elongate bit body having an axial forward end; and a monolithic hard insert being affixed to the bit body at the axial forward end thereof, and the hard insert presenting at least three discrete leading cutting edges for cutting the earth strata.

2. The rotary drill bit of claim 1 wherein the bit body containing a lobed socket in the axial forward end thereof, and the hard insert containing a lobed projection, and the lobed projection of the hard insert being received within the lobed socket in the bit body.

3. The rotary drill bit of claim 1 wherein the bit body having a lobed projection projecting from the axial forward end thereof, the hard insert containing a lobed socket, and the lobed projection being received within the lobed socket.

4. The rotary drill bit of claim 1 wherein each one of the leading cutting edges for cutting the earth strata having a generally radial orientation.

5. The rotary drill bit of claim 1 wherein each one of the leading cutting edges for cutting the earth strata having a corresponding side clearance cutting edge.

6. The rotary drill bit of claim 1 wherein the rotary drill bit having a central longitudinal axis passing through a center point of the hard insert, the bit body having a peripheral surface, and each one of the leading cutting edges for cutting the earth strata beginning at a point radially outward of the center point of the hard insert and extending in a direction away from the center point so as to terminate at a point radially outward of the peripheral surface of the bit body.

7. The rotary drill bit of claim 1 wherein each one of the leading cutting edges for cutting the earth strata being formed by a corresponding leading surface of the hard insert intersecting a corresponding top surface of the hard insert, and each one of the leading surfaces being disposed at a rake angle of between about zero degrees and about negative fifteen degrees.

8. The rotary drill bit of claim 1 wherein the hard insert covers substantially all of the axial forward end of the bit body.

9. The rotary drill bit of claim 1 wherein the bit body having a peripheral surface and containing a central bore, and the bit body further containing at least three ports in the peripheral surface communicating with the central bore.

10. A rotary drill bit for penetrating earth strata, the drill bit comprising: an elongate bit body having an axial forward end; and a monolithic hard insert being affixed to the bit body at the axial forward end thereof, and the hard insert presenting at least three discrete leading cutting edges for cutting the earth strata, the bit body having a peripheral surface and containing a central bore, and the bit body further containing at least three ports in the peripheral surface communicating with the central bore, and each one of the ports has an axial forward edge, and the axial forward edge of each port is spaced a different distance away from the axial forward end of the bit body.

11. A rotary drill bit for penetrating the earth strata, the drill bit comprising: an elongate drill bit body having an axial forward end, the elongate drill bit body having a longitudinal axis, the axial forward end being defined at least in part by a discrete first axial forward surface that is generally perpendicular to the longitudinal axis and a discrete second axial forward surface that is generally perpendicular to the longitudinal axis, and the first axial forward surface being axially spaced apart from the second axial forward surface; a hard insert being affixed to the axial forward end of the drill bit body so as to form a joint between the hard insert and the bit body wherein the joint being defined at least in part by the second axial forward surface.

12. The rotary drill bit of claim 11 wherein the first axial forward surface being generally parallel to the second axial forward surface.

13. The rotary drill bit of claim 11 wherein the drill bit body having a projection projecting away from the axial forward end thereof, the second axial forward surface defining a distal end of the projection, and the first axial forward surface being radially outward of the second axial forward surface.

14. The rotary drill bit of claim 11 wherein the drill bit body containing a socket at the axial forward end thereof, and the first axial forward surface defining a periphery about the socket, and the first axial forward surface being radially outward of the second axial forward surface.

15. The rotary drill bit of claim 11 wherein the drill bit body having a central bore, the hard insert containing a first passage therethrough, the drill bit body containing a second passage therethrough, and the first passage in the hard insert being aligned with the second passage in the drill bit body so as to provide direct communication between the hard insert and the central bore of the drill bit body.

16. The rotary drill bit of claim 11 wherein the drill bit body having at least one scalloped portion containing a debris port therein, the scalloped portion beginning at and extending in an axial rearward direction away from the axial forward end of the bit body, and the scalloped portion becoming narrower and shallower as the scallop moves in the axial rearward direction.

17. The rotary drill bit of claim 11 wherein the drill bit body having at least one scalloped portion containing a debris port therein, and a debris breaker being in the scalloped portion mediate of the debris port and the axial forward end of the drill bit body.

18. A rotary drill bit for penetrating the earth strata, the drill bit comprising: an elongate drill bit body having an axial forward end, the axial forward end being defined at least in part by a discrete first axial forward surface and a discrete second axial forward surface, and the first axial forward surface being axially spaced apart from the second axial forward surface; a hard insert being affixed to the axial forward end of the drill bit body so as to form a joint between the hard insert and the bit body wherein the joint being defined at least in part by the second axial forward surface wherein the hard insert being a single monolithic member, and the hard insert presenting at least three discrete leading cutting edges for cutting the earth strata.

19. A hard member for attachment to a drill bit body so as to form a rotary drill bit for penetrating the earth strata and the rotary drill bit having a central longitudinal axis, the hard member comprising: a forward surface and a rearward surface, and at least three discrete leading cutting edges for cutting the earth strata projecting from the forward surface of the hard member, and the hard member is a single monolithic piece.

20. The hard member of claim 19 wherein the hard insert further including a side clearance cutting edge for cutting the earth strata corresponding to each one of the leading cutting edges for cutting the earth strata.

21. The hard member of claim 19 wherein each one of the leading cutting edges for cutting the earth strata being defined at the intersection of a corresponding top surface and a corresponding leading surface, and each one of the leading surfaces being disposed at a rake angle of between about zero degrees and about negative fifteen degrees.

22. A hard member for attachment to a drill bit body so as to form a rotary drill bit for penetrating the earth strata and the rotary drill bit having a central longitudinal axis, the hard member comprising: a forward surface and a rearward surface, and at least three discrete leading cutting edges for cutting the earth strata projecting from the forward surface of the hard member wherein the hard member having a center point through which the central longitudinal axis of the rotary drill bit passes, the bit body having a peripheral surface, and each one of the leading cutting edges beginning at a point spaced away from the center point of the hard member and extending in a direction away from the center point and the hard member is a single monolithic piece.

23. A hard member for attachment to a drill bit body so as to form a rotary drill bit for penetrating the earth strata and the rotary drill bit having a central longitudinal axis, the hard member comprising: a forward surface and a rearward surface, and at least three discrete leading cutting edges for cutting the earth strata projecting form the forward surface of the hard member, and the hard member comprising a hard body and at least three discrete cutting elements affixed to the hard body, each one of the cutting elements defining one of the leading cutting edges for cutting the earth strata, and the cutting elements having a hardness substantially equal to the hardness of the hard body.

24. An elongate rotary drill bit body for attachment to a hard member so as to form a rotary drill bit for penetrating earth strata that generates debris, the drill bit body comprising a peripheral surface, at least one scalloped portion in the peripheral surface, and a debris breaker being contained in the scalloped portion wherein the debris impinges upon the debris breaker during the penetration operation.

25. The elongate rotary drill bit body of claim 24 further including an axial forward end being defined at least in part by a first axial forward surface and a second axial forward surface, the second axial forward surface being axially spaced apart from the first axial forward surface, and the second axial forward surface defining the surfaces of the drill bit body that at least in part form a joint between the hard member and the drill bit body when the hard member is attached to the drill bit body; the joint between the hard insert and the drill bit body being further defined by the first axial forward surface; and the first axial forward surface being generally parallel to the second axial forward surface.

26. The rotary drill bit body of claim 25 further including a lobed projection projecting away from the axial forward end of the drill bit body, the second axial forward surface defining an axial forward most surface of the drill bit body, and the first axial forward surface being radially outward of the second axial forward surface.

27. The rotary drill bit body of claim 25 further containing a lobed socket in the axial forward end of the drill bit body, the first axial forward surface defining an axial forward most surface of the drill bit body, and the first axial forward surface being radially outward of the second axial forward surface.

28. The elongate rotary drill bit body of claim 24 further containing a communication aperture in the axial forward end thereof.

29. An elongate rotary drill bit body for attachment to a hard member so as to form a rotary drill bit for penetrating the earth strata that generates debris, the drill bit body comprising a peripheral surface, at least one scalloped portion in the peripheral surface, and a debris breaker being contained in the scalloped portion wherein the debris impinges upon the debris breaker during the penetrating operation, and further including a pedestal portion adjacent to the axial forward end, and the pedestal portion including at least three scalloped portions wherein each adjacent pair of scalloped portions defining one of a trio of pedestal lobes, and wherein each one of the pedestal lobes presenting a peripheral surface that widens as the pedestal lobe moves in an axial rearward direction.

30. The rotary drill bit body of claim 29 wherein each of the scalloped portions contains a communication aperture.

31. The rotary drill bit body of claim 30 wherein each one of the apertures has an axial forward edge, and the axial forward edge of each aperture is spaced a different distance from the axial forward end of the drill bit body.

32. A rotary drill bit for engaging an earth strata comprising: a drill bit body having an axial forward end; a hard body being affixed to the drill bit body at the axial forward end thereof; the drill bit body having a first hardness, the hard body having a second hardness, the hard body carrying at least three discrete cutting elements wherein each one of the cutting elements presenting a leading cutting edge for cutting the earth strata; and the cutting elements having a third hardness greater than each one of the second hardness of the hard body and the first hardness of the bit body, and the second hardness of the hard body is greater than the first hardness of the bit body.

33. The rotary drill bit of claim 32 wherein the hard body containing at least three pockets, and each one of the cutting elements being affixed in its corresponding one of the pockets.

34. The rotary drill bit of claim 33 wherein each one of the cutting elements having a projection registering with a corresponding notch in the pocket so as to position the cutting elements within the pocket.

35. A roof drill bit body for attachment to a hard component so as to form a rotary drill bit for penetrating earth strata that generates debris, the drill bit body comprising: a central bore, and a peripheral surface; and the peripheral surface containing at least three apertures being in communication with the central bore including at least three scallops wherein each one of the apertures is contained in its corresponding one of the scallops, further including an axial forward end, and each one of the scallops beginning at the axial forward end of the drill bit body and becoming shallower and narrower as it moves in an axial rearward direction, and each scallop has an axial rearward boundary, and the axial rearward boundary for each scallop is at a different distance away from the axially forward end of the roof drill bit body.

36. A roof drill bit body for attachment to a hard component so as to form a rotary drill bit for penetrating earth strata that generates debris, the drill bit body comprising: a central bore, and a peripheral surface; and the peripheral surface containing at least three apertures being in communication with the central bore, and further including an axial forward end, each one of the apertures has a forward edge, and the apertures have an orientation so that the forward edge of each one of the apertures is spaced a different distance away from the axial forward end of the roof drill bit body.

37. A roof drill bit body for attachment to a hard component so as to form a rotary drill bit for penetrating earth strata that generates debris, the drill bit body comprising: a central bore, and a peripheral surface; and the peripheral surface containing at least three apertures being in communication with the central bore, and further including an axial forward end, each one of the apertures has a center, and the center of each one of the apertures is spaced a different distance away from the axial forward end of the roof drill bit body.

38. A roof drill bit body for attachment to a hard component so as to form a rotary drill bit for penetrating earth strata that generates debris, the drill bit body comprising: a central bore, and a peripheral surface; and the peripheral surface containing at least three apertures being in communication with the central bore, and further including an axial forward end, each one of the apertures has a rearward edge, and the rearward edge of each one of the apertures is spaced a different distance away from the axial forward end of the drill bit body.

* * * * *